Patented Oct. 30, 1934

1,978,786

UNITED STATES PATENT OFFICE 1,978,786

COLORATION OF TEXTILE MATERIALS

George Holland Ellis, Spondon, near Derby, England, assignor to Celanese Corporation of America, a corporation of Delaware No Drawing. Application January 5, 1931, Serial No. 506,759. In Great Britain January 28, 1930

11 Claims. (Cl. 3—5)

This invention relates to the treatment of textile materials in alkaline dye vats.

It is well known that in the coloration of textile materials of vegetable origin e. g. cotton, methods involving the use of strongly alkaline dye vats for example vats containing caustic soda, sodium sulphide or sodium hydrosulphide, find extensive application. In the specification I use the word "vatting" as a general term to include all such methods. Among coloring matters which are applied by such methods it is usual to distinguish two large classes, the vat dyes and the sulphur dyes. The vats used in vat dyeing are in general strongly alkaline and are therefore liable to damage textile materials of animal origin, cellulose acetate and other cellulose esters, and to a less extent cellulose ethers and regenerated cellulosic materials such as viscose. For this reason processes involving the subjection of such materials to such alkaline vats have hitherto been regarded as impracticable. I have now found however that "vatting" processes may be applied to such materials with valuable results and without damage to the material provided the temperature of the vat is maintained below atmospheric temperature.

According therefore to the present invention the coloration of textile materials and particularly materials liable to be damaged by alkaline media e. g. materials comprising cellulose acetate or other organic derivatives of cellulose, regenerated cellulose or animal fibres, alone or in admixture one with another, or with textile materials of vegetable origin, is effected from an alkaline dye vat maintained below atmospheric temperature and particularly at temperatures not substantially above 10° or 5° C.

As an example of the application of my invention to artificial fibres derived from cellulose, mention may be made of the dyeing of cellulose acetate by a vat dye e. g. a dye of the indigoid class or other vat dyes having an affinity therefor mentioned in French Patent No. 706,789.

By the application of my invention to mixtures containing such artificial fibres, a large variety of color effects may be obtained according to the relative affinities of the components of the mixture for the selected colors. Thus, for example, by the choice of suitable dyes I may effect the coloration of any one component, or of all the components of a mixture and the latter case is not limited to the production of a uniform shade throughout the mixture since by the use of appropriate dyes it is possible in the same operation to obtain different shades upon the several components.

My invention may be performed with or without previous or subsequent application of suitable dyestuffs. A mixed material may for example be first subjected to a dyebath so constituted that one component is colored therein, and may subsequently be treated in a different dyebath whereby the remaining component is colored, one or both of these dyebaths being an alkaline vat maintained at a temperature below atmospheric temperature. Thus in the case of a mixture of cellulose acetate and cotton the cotton may be colored without affecting the cellulose acetate by treatment of the mixture in an alkaline vat containing a vat dye having little or no affinity for cellulose acetate, for example a vat dye of the anthraquinone series, the vat being maintained below atmospheric temperature. The cellulose acetate component may then be dyed without affecting the color of the cotton, by treatment for example in a neutral or acid dyebath containing the free leuco compound of a vat dye according to the invention described in U. S. Patent No. 1,900,172, or by other suitable means e. g. by the methods described in U. S. Patents Nos. 1,618,413, 1,618,414, 1,694,413, 1,690,481, 1,716,721, 1,803,008 and 1,840,572.

In the above example the cotton may be replaced by any other material of a cellulosic nature whether natural or artificial, while the cellulose acetate may be replaced by any other organic substitution product of cellulose.

The vat dyes available for coloration of the cellulosic component according to this application of my invention are many and various. Among those with which I have obtained particularly good results may be mentioned the following:—

Caledon brown R_____ Color Index No. 1151
Indanthrene
 orange RRT_____ Color Index Supplement
  page 43
Caledon yellow G_____ Color Index No. 1118
Caledon red 5G_____ Color Index No. 1131
Caledon jade green_____ Color Index No. 1101
Caledon blue G CD_____ Color Index No. 1113
Caledon brilliant violet R__ Color Index No. 1135

The temperature at which the alkaline vat is maintained in carrying out my invention may be varied with the concentration of the alkali and the duration of the dyeing operation. With the dyes mentioned above in the vats in which they are commonly employed I have found that excellent results may be obtained by maintaining the temperature at 0.5° C., but in order to secure the advantages peculiar to my invention it is not necessary to work at so low a temperature. Thus for example at a temperature of about 15° C. there is much less danger of damaging the fibre than at the ordinary temperature of vat dyeing. On the other hand, the temperature may be reduced below 0.5° C. down to a temperature at which the dye vat no longer remains liquid.

The following examples show the best methods known to me for carrying the invention into effect, but they are not intended to limit the invention in any way:—

Example 1

To dye 10 kilogrammes of a fabric composed of cellulose acetate and cotton in approximately equal proportions so that the cellulose acetate is dyed red and the cotton blue:—

500 grams of the dyestuff Indanthrene blue R. K.pdr. (Color Index No. 1108) is pasted with 20 litres of water at 40° C., 300 grams of caustic soda added, and 600 grams sodium hydrosulphite added to effect reduction. This solution is then added to a dyebath of 800 litres of cold water containing 500 grams of caustic soda and one kilogramme of sodium hydrosulphite, and the volume and temperature adjusted to 1000 litres at 0° C. with ice and water. The fabric is then entered, and worked in the dyebath for a sufficient length of time until the cotton has attained the desired depth, lifted, rinsed and allowed to oxidize in air. The cellulose acetate is now dyed with 50 grams of 1-amino-4-oxyanthraquinone for example according to my previous U. S. Patent No. 1,618,413.

Example 2

To dye 10 kilogrammes of a fabric composed of cellulose acetate and viscose in approximately equal proportions so that the cellulose acetate is dyed blue and the viscose red:—

400 grams of the dyestuff Caledon red BN.pdr. (Color Index No. 1162) is reduced and the viscose dyed exactly as the cotton in Example 1 above. The fabric is then lifted, rinsed, allowed to oxidize, and soaped, and the cellulose acetate dyed with 200 grams of Ciba blue 2B (Color Index No. 1184) as a dispersion of the free leuco compound according to U. S. Patent No. 1,900,172.

Example 3

To dye 10 kilogrammes of cellulose acetate fabric a blue shade:—

500 grams of the dyestuff Ciba blue 2B.pdr. (Color Index No. 1184) is pasted with 20 litres of water at 40° C. 300 grams of caustic soda added and 600 grams sodium hydrosulphite added to effect reduction. This solution is then added to a dyebath of 800 litres of cold water, containing 500 grams of caustic soda and one kilogramme of sodium hydrosulphite, and the volume and temperature adjusted to 1000 litres at 10° C. with cold water. The fabric is then entered and worked in this bath until the desired shade is obtained, then lifted, rinsed, allowed to oxidize in air, soaped, and dried or otherwise treated as requisite.

Although my invention has been illustrated with particular reference to certain vat dyes it is applicable also to dyeing by means of the sulphur or sulphide dyes and in fact to any process involving the application of a dye in a solution containing a strong alkali and is of especial value in the treatment of materials containing fibres of animal or artificial origin in admixture one with another or with fibres of vegetable origin.

The strong alkali of the dye vat may be accompanied or replaced by any of the substances used as substitutes for strong alkali in the invention described and claimed in British Patent No. 263,473, or by ammonia and/or a base derived therefrom by substitution.

The dye vat may or may not contain protective colloids.

What I claim and desire to secure by Letters Patent is:—

1. Process for the coloration of textile materials by vatting methods, characterized in that the vats are maintained at temperatures not substantially above 10° C.

2. Process for the coloration of textile materials by vatting methods, characterized in that the vats are maintained at temperatures not substantially above 0° C.

3. Process for the coloration of textile materials by vatting methods, characterized in that the vats are maintained at temperatures below 15° C.

4. Process for the coloration of textile materials comprising organic derivatives of cellulose by vatting methods, characterized in that the vats are maintained at temperatures not substantially above 10° C.

5. Process for the coloration of textile materials comprising organic derivatives of cellulose by vatting methods, characterized in that the vats are maintained at temperatures not substantially above 0° C.

6. Process for the coloration of textile materials comprising cellulose acetate by vatting methods, characterized in that the vats are maintained at temperatures not substantially above 10° C.

7. Process for the coloration of textile materials comprising cellulose acetate by batting methods, characterized in that the vats are maintained at temperatures not substantially above 0° C.

8. Process for the coloration of textile materials comprising organic derivatives of cellulose by vatting methods, characterized in that the vats are maintained at temperatures not substantially above 10° C. and contain an indigoid dye.

9. Process for the coloration of textile materials comprising organic derivatives of cellulose by vatting methods, characterized in that the vats are maintained at temperatures not substantially above 0° C. and contain an indigoid dye.

10. Process for the coloration of textile materials comprising organic derivatives of cellulose and other fibres by vatting methods, characterized in that the materials are treated in vats containing a dyestuff having substantially no affinity for the organic derivative of cellulose and are maintained at temperatures not substantially above 10° C.

11. Process for the coloration of textile materials comprising organic derivatives of cellulose and other fibres by vatting methods, characterized in that the materials are treated in vats containing a dyestuff having substantially no affinity for the organic derivative of cellulose and are maintained at temperatures not substantially above 0° C.

GEORGE HOLLAND ELLIS.